United States Patent
Kwag et al.

(10) Patent No.: US 11,064,578 B2
(45) Date of Patent: Jul. 13, 2021

(54) ELECTROMAGNETIC INDUCTION HEATING COOKING APPLIANCE

(71) Applicant: LG ELECTRONICS INC., Seoul (KR)

(72) Inventors: Dongseong Kwag, Seoul (KR); Yangkyeong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 323 days.

(21) Appl. No.: 15/945,182

(22) Filed: Apr. 4, 2018

(65) Prior Publication Data

US 2018/0295679 A1 Oct. 11, 2018

(30) Foreign Application Priority Data

Apr. 10, 2017 (KR) .................. 10-2017-0045942

(51) Int. Cl.
*H05B 6/12* (2006.01)
*H05B 6/06* (2006.01)

(52) U.S. Cl.
CPC ............. *H05B 6/129* (2013.01); *H05B 6/062* (2013.01); *Y02B 40/00* (2013.01)

(58) Field of Classification Search
CPC ....... H05B 6/062; H05B 6/129; Y02B 40/126
USPC ......................................................... 219/627
See application file for complete search history.

(56) References Cited

U.S. PATENT DOCUMENTS

| 6,864,468 | B2* | 3/2005 | Kim ..................... H05B 6/129 219/601 |
| 8,511,769 | B2* | 8/2013 | Busalt .................... F24C 15/16 312/334.21 |
| 2004/0144773 | A1 | 7/2004 | Kim et al. |
| 2007/0131669 | A1 | 6/2007 | Lee et al. |
| 2011/0303652 | A1* | 12/2011 | Sano ...................... F24C 15/02 219/622 |

(Continued)

FOREIGN PATENT DOCUMENTS

| CN | 1517591 | 8/2004 |
| CN | 102365497 | 2/2012 |

(Continued)

OTHER PUBLICATIONS

Korean Office Action dated Oct. 10, 2018.
(Continued)

*Primary Examiner* — Dana Ross
*Assistant Examiner* — Joseph W Iskra
(74) *Attorney, Agent, or Firm* — Ked & Associates LLP (57) ABSTRACT

An electromagnetic induction heating cooking appliance may include a body comprising a wireless power transmitter that transmits power wirelessly, a first wireless communication module that transmits and receives signals wirelessly, and an electromagnetic induction heater that heats food or food materials accommodated in a space in the body using an induced current, and a door comprising a wireless power receiver that faces the wireless power transmitter, a second wireless communication module that faces the first wireless communication module, and an electronic device connected to the wireless power receiver that receives power via the wireless power receiver. The door may be coupled with the body such that it opens and closes the space in the body.

18 Claims, 6 Drawing Sheets

(56) References Cited

U.S. PATENT DOCUMENTS

2013/0313248 A1* 11/2013 Allen ..................... F24C 7/088
                                                                219/623

FOREIGN PATENT DOCUMENTS

| CN | 104253881 | | 12/2014 |
|----|-----------|---|---------|
| DE | 198 52 617 | | 1/2000 |
| EP | 1 441 567 | | 7/2004 |
| JP | 60-256729 | | 12/1985 |
| KR | 10-2014-0128650 | | 11/2014 |
| KR | 20140128650 | * | 11/2014 |

OTHER PUBLICATIONS

European Search Report dated Nov. 23, 2020 issued in Application No. 17905133.9.
Chinese Office Action issued in Application No. 2021041201981750 dated Apr. 15, 2021.

* cited by examiner

ELECTROMAGNETIC INDUCTION HEATING COOKING APPLIANCE

CROSS-REFERENCE TO RELATED APPLICATION(S)

This application claims the priority of Korean Patent Application No. 10-2017-0045942, filed in Korea on Apr. 10, 2017, in the Korean Intellectual Property Office, the disclosure of which is hereby incorporated by reference in its entirety.

BACKGROUND

1. Field

An electromagnetic induction heating cooking appliance is disclosed herein.

2. Background

Typically, a cooking appliance is used to cook various foods or other items (hereinafter "food"), such as rice, soup, and stew or to warm up food with heating devices. An electromagnetic induction heating cooking appliance is used to cook food by generating heat with an electromagnetic force. It utilizes the principle that when a metal is placed in a changing magnetic field, an eddy current is generated by electromagnetic induction, such that heat is generated in the metal by the current.

Various products such as a microwave oven using microwaves, an oven using a heater, and a cooktop, for example, are widely used as cooking appliances. The microwave oven heats food using electromagnetic radiation, generated by a magnetron in a sealed cooking chamber, to vibrate water molecules in the food, thereby producing thermal energy. The oven uses a heater to heat a sealed cooking chamber, thereby heating food contained therein.

In existing cooking appliances, electronic devices such as a display and input buttons are mounted on a door, and a power supply line that supplies power to the electronic devices is connected from a body of the cooking appliance to the door. The power supply line is exposed to the outside of the appliance, creating a disorderly appearance. Further, the power supply line may be damaged if the door is opened and closed repeatedly, resulting in safety issues in using the cooking appliance. In an existing oven toaster, a door is coupled with a body via a hinge. It may therefore be difficult to put food or a food container into the cooking chamber of the oven toaster without spilling the contents. To overcome this inconvenience, a cooking plate such as a heating plate or a supporting plate may be drawn into and out of the oven toaster as the door moves. The power supply line is also drawn into and out of the oven toaster as the door moves, making the oven toaster structurally complicated and creating a disorderly appearance.

In an existing cooking appliance in which electronic devices such as a display and input buttons are mounted on the door, a communications wire that transmits and receives information to and from the body of the cooking appliance is connected from the body to the door. In this case, the communications line is also exposed to the outside, which causes a similar inconvenience as the exposed power supply line and adds to a disorderly appearance.

An existing pop-up toaster is very difficult to clean. An existing oven type toaster is also difficult to clean due to an infrared heater at its bottom.

BRIEF DESCRIPTION OF THE DRAWINGS

Embodiments will be described in detail with reference to the following drawings in which like reference numerals refer to like elements, and wherein.

DETAILED DESCRIPTION

Figure 1:
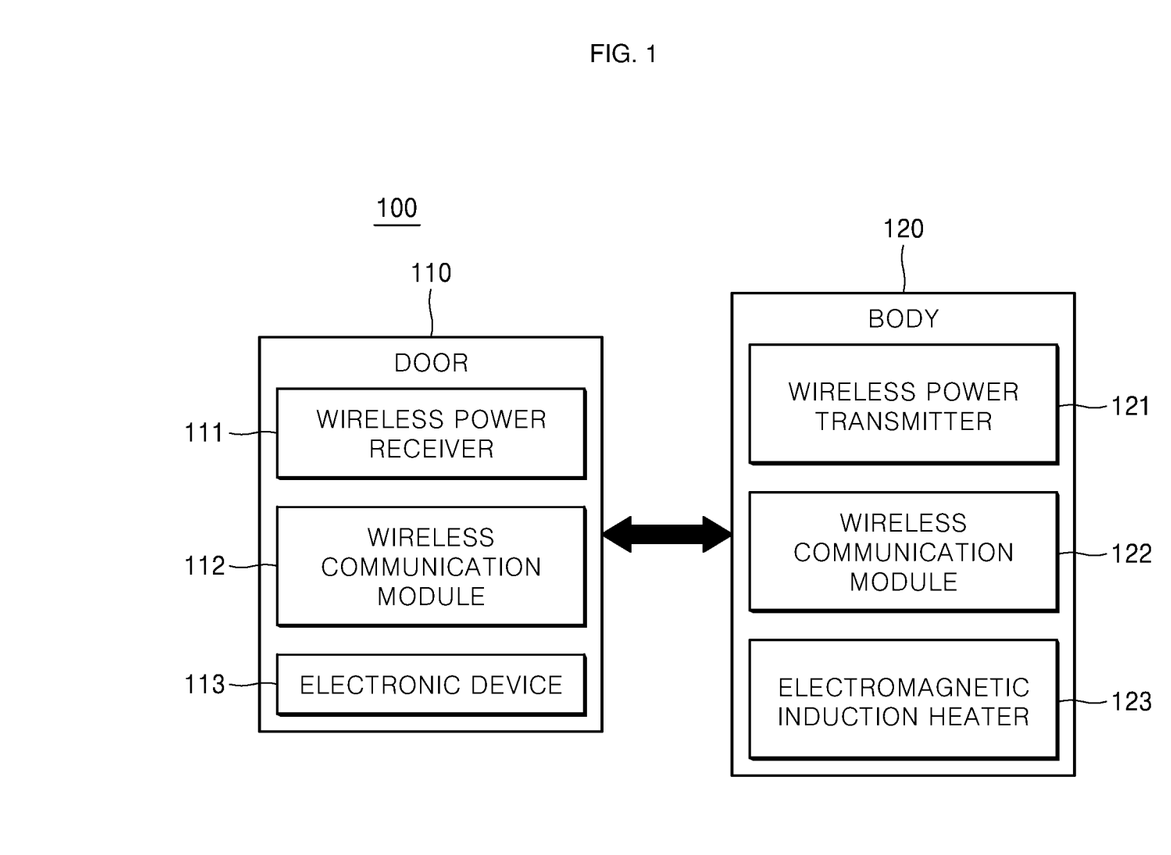
FIG. 1 is a block diagram schematically showing an electromagnetic induction heating cooking appliance according to an embodiment.

FIG. 1 is a block diagram schematically showing an electromagnetic induction heating cooking appliance according to an embodiment. As shown in FIG. 1, an electromagnetic induction heating cooking appliance 100 may include a door 110 and a body 120. The door 110 may open and close an internal space formed in the body 120 and may be coupled with the body 120.

The body 120 may include a wireless power transmitter 121, a wireless communication module 122, and an electromagnetic induction heater 123. The wireless power transmitter 121 may wirelessly transmit power to the door 110 by magnetic induction or magnetic resonance, for example. The wireless communication module 122 may wirelessly transmit or receive signals to and from the door 110.

The electromagnetic induction heater 123 may heat food accommodated in the internal space of the body 120 with an induced current. The wireless communication module 122 and the electromagnetic induction heater 123 may be provided such that they face the door 110. Such a configuration may prevent the induced current or the electromagnetic wave for wireless communication from being blocked due to structural features, such as a heating plate, included in the electromagnetic induction heater 123.

The door 110 may include a wireless power receiver 111, a wireless communication module 112, and electronic device 113. The wireless power receiver 111 may wirelessly receive power via the wireless power transmitter 121 of the body 120 and may face the wireless power transmitter 121. The wireless communication module 112 of the door 110 may transmit or receive information to and from the body 120 by wirelessly communicating with the wireless communication module 122 of the body 120. The wireless communication module 112 may face wireless communication module 122, and vice versa.

The electronic device 113 may be implemented as an input and output display and may be connected to the wireless power receiver 111 to receive power via the wireless power receiver 111. The electronic device 113 may transmit and receive information to and from the wireless communication module 122 of the body 120 via the wireless communication module 112 of the door 110. The transmitted and received information may be displayed on the electronic device 113.

The door 110 of the electromagnetic induction heating cooking appliance 100 according to an embodiment may wirelessly receive electric power from the body 120, may wirelessly transmit and receive information to and from the body 120, and may display on the electronic device 113 information associated with the body 120. The electromagnetic induction heating cooking appliance 100 may be implemented as a variety of electronic products that include an electromagnetic induction heater and a door.

Figure 2:
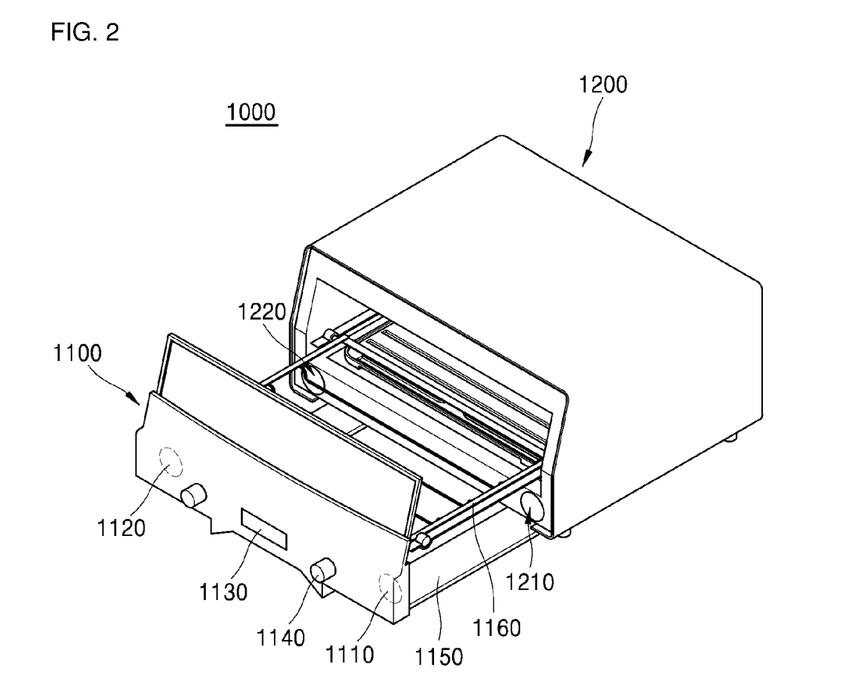
FIG. 2 is a perspective view of an oven toaster as an example of the electromagnetic induction heating cooking appliance shown in FIG. 1 according to an embodiment.
Figure 3:
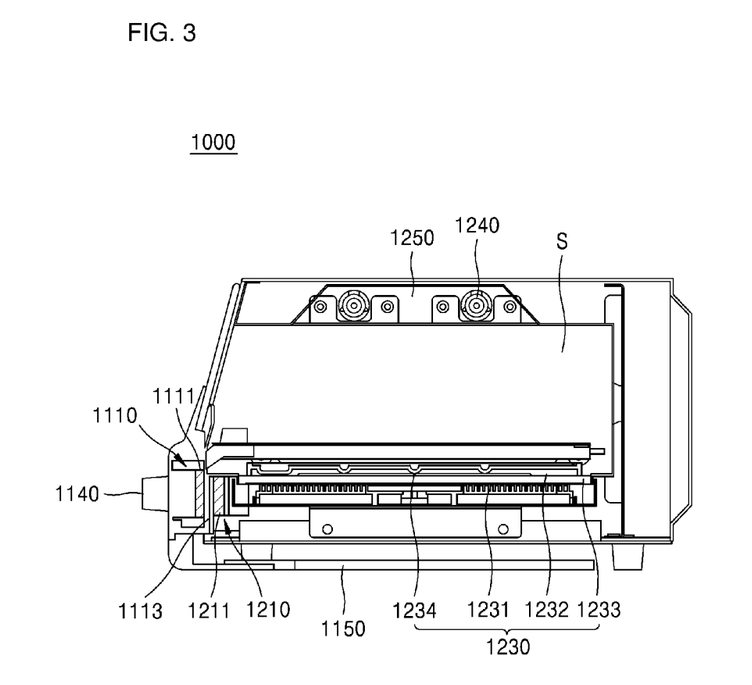
FIG. 3 is a view schematically showing the oven toaster shown in FIG. 2.

FIG. 2 is a perspective view of an oven toaster as an example of the electromagnetic induction heating cooking appliance shown in FIG. 1 according to an embodiment. FIG. 3 is a view schematically showing the oven toaster shown in FIG. 2.

As shown in the drawings, an oven toaster 1000 may include a door 1100 and a body 1200. The door 1100 may be coupled to the body 1200 and may open and close a space S formed in the body 1200. Space S may accommodate food or a food container to be heated or cooked, and include a wireless power transmitter 1210, a wireless communication module 1220, and an electromagnetic induction heater 1230.

The wireless power transmission module 1210 may face the door 1100 and may include a transmitting coil 1211 and an inverter that supplies power to the transmitting coil 1211. The wireless communication module 1220 may wirelessly transmit and receive signals to and from the wireless communication module 1120. That is, the wireless communication module 1220 of the body 1200 may receive information shown on a display 1130 and entered into an input 1140 of the door 1100 via the wireless communication module 1120 of the door 1100, and may transmit information about the body 1200 to the door 1100. The wireless communication module 1220 may include a wireless communication board and may be a local area communication module. In addition, the wireless communication module 1220 may face the door 1100.

The electromagnetic induction heater 1230 may heat food accommodated in space S and may include a working coil 1231, a heating plate 1232, a bottom board 1233, and a temperature sensor 1234. The heating plate 1232 may be made of a magnetic material, for example, and a current induced in the working coil 1231 may generate heat and may heat the heating plate 1232. The bottom board 1233 may support the heating plate 1232 and may be made of a ceramic plate, for example, that does not interfere with a transmission of the induced current. The temperature sensor 1234 may measure a temperature of the heating plate 1232 and may contact a central portion of the heating plate 1232. A hole may be formed in the bottom board 1233, and the temperature sensor 1234 may be inserted into the hole to measure the temperature of the heating plate 1232. Alternatively, the temperature of the heating plate 1232 may be measured without contact by making a portion of the bottom board 1233 transparent and by using a non-contact temperature sensor.

The electromagnetic induction heater 1230 may be provided at a lower portion of the body 1200 such that it generates heat upwards. An infrared heater 1240 may be provided at an upper portion of the body 1200. A reflection plate 1250 that reflects radiant heat from the heating plate 1232 may be mounted at the upper portion of the body 1200.

The door 1100 may include a wireless power receiver 1110, a wireless communication module 1120, a display 1130, and an input 1140. The wireless power receiver 1110 may include a receiving coil 1111 and may face the wireless power transmitter 1210. When the door 1100 is coupled to the body 1200 so as to cover or close space S, the receiving coil 1111 may be located adjacent to the wireless power transmitter 1211 such that it faces the transmitting coil 1211. The wireless power receiver 1110 may wirelessly receive power from the wireless power transmitter 1210.

The wireless communication module 1120 of the door 1100 may transmit and receive information to and from the wireless communication module 1220 of the body 1200. The wireless communication module 1120 may face the wireless communication module 1220, and vice versa.

The display 1130 may display an operating state of the body 1200 or an input menu. The input 1140 allows such an input menu to be selected by a user to operate the electromagnetic induction heater 1230 of the body 1200 and may receive power via the wireless power receiver 1110. The input 1140 and the display 1130 may be formed integrally and may be implemented as a touch screen.

A support plate 1150 may be provided at a lower end of the door 1100. The support plate 1150 may be drawn into contact with the body 1200 to close space S or may be drawn out of the body 1200 to guide the door 1100 and open space S.

A pocket or groove that guides the support plate 1150 may be formed in the body 1200. The door 1100 may further include a holding wire 1160 that supports food or a food container. The holding wire 1160 may be drawn out of or into space S of the body 1200 as the door 1100 is opened or closed, and may face the electromagnetic induction heater 1230 when it is drawn into space S.

According to an embodiment, the heating plate 1232 may be coupled with the door 1100 such that the heating plate 1232 may be drawn out of or into space S to face the working coil 1231.

A surface of the body 1200 that faces the door 1100 may contain grooves 1113 in which the wireless power transmitter 1210 and the wireless communication module 1220 may be implemented. Such a surface of the body 1200 may receive the wireless power receiver 1110 in the grooves and may cover the wireless power receiver 1110 with a cover.

Figure 4:
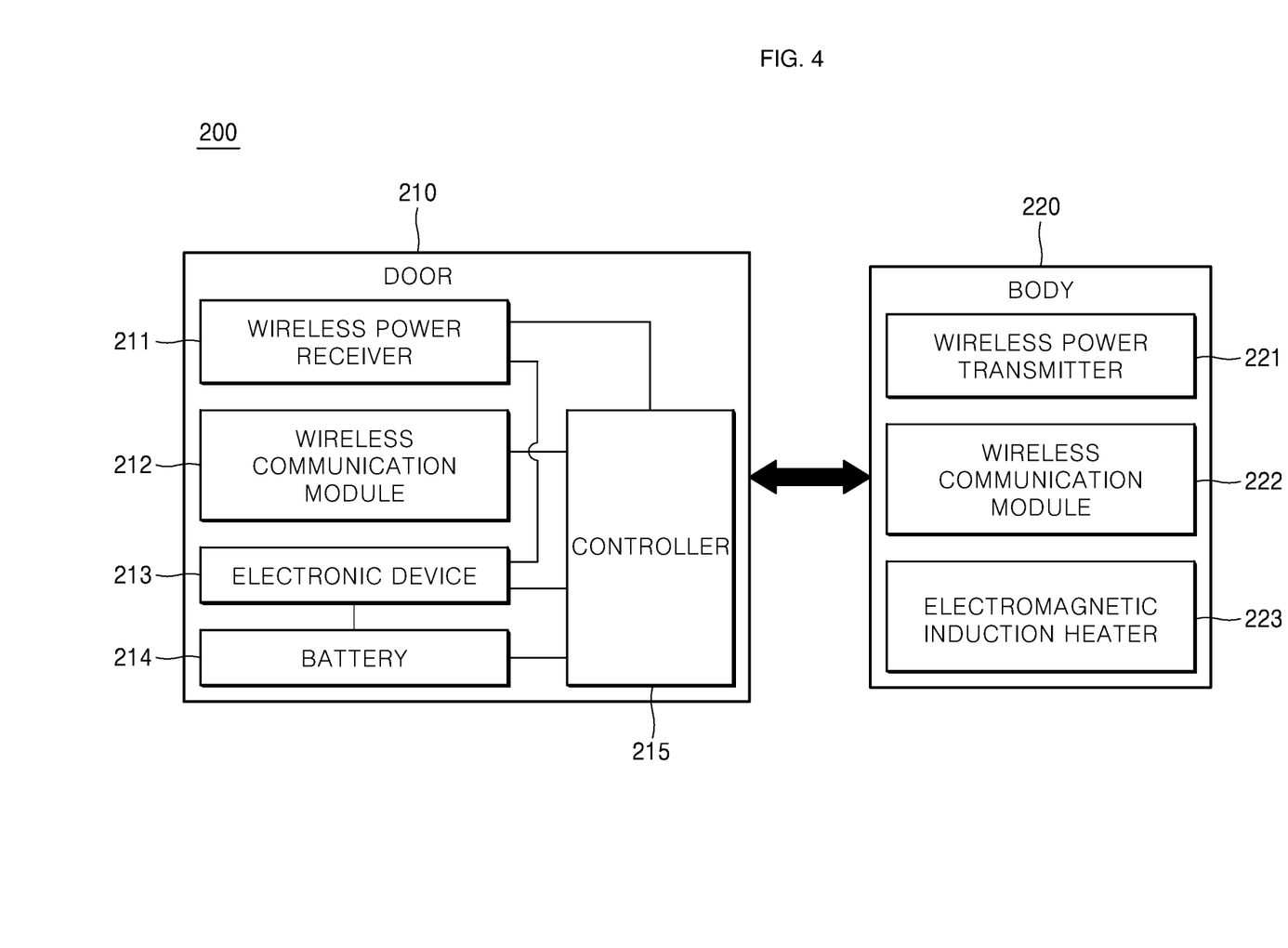
FIG. 4 is a block diagram schematically showing an electromagnetic induction heating cooking appliance according to an embodiment.

FIG. 4 is a block diagram schematically showing an electromagnetic induction heating cooking appliance according to an embodiment. As shown in FIG. 4, electromagnetic induction heating cooking appliance 200 may be identical to the electromagnetic induction heating cooking appliance 100 shown in FIG. 1 except that the former may include a battery and may further include a controller.

The electromagnetic induction heating cooking appliance 200 may include a door 210 and a body 220. The body 120 may include a wireless transmitter 221, a wireless communication module 222, and an electromagnetic induction heater 223. The door 210 may include a wireless power receiver 211, a wireless communication module 212, electronic device 213, a battery 214, and a controller 215. The battery may be a wireless rechargeable battery.

The electronic device 213 of the door 210 may receive power via the wireless power receiver 211 powered by the wireless power transmitter 221 or may receive power from the battery 214. The power may be supplied to the electronic device 213 under the control of the controller 215. When the door 210 is drawn out of the body 220, the wireless power receiver 211 may not wirelessly receive power from the wireless power transmitter 221, so the electronic device 213 may receive power via the battery 214.

The controller 215 may check an amount of power supplied to the electronic device 213 via the wireless power receiver 211. If the amount is small, the controller 215 may control the battery 214 so that it supplies power to the electronic device 213.

Figure 5:
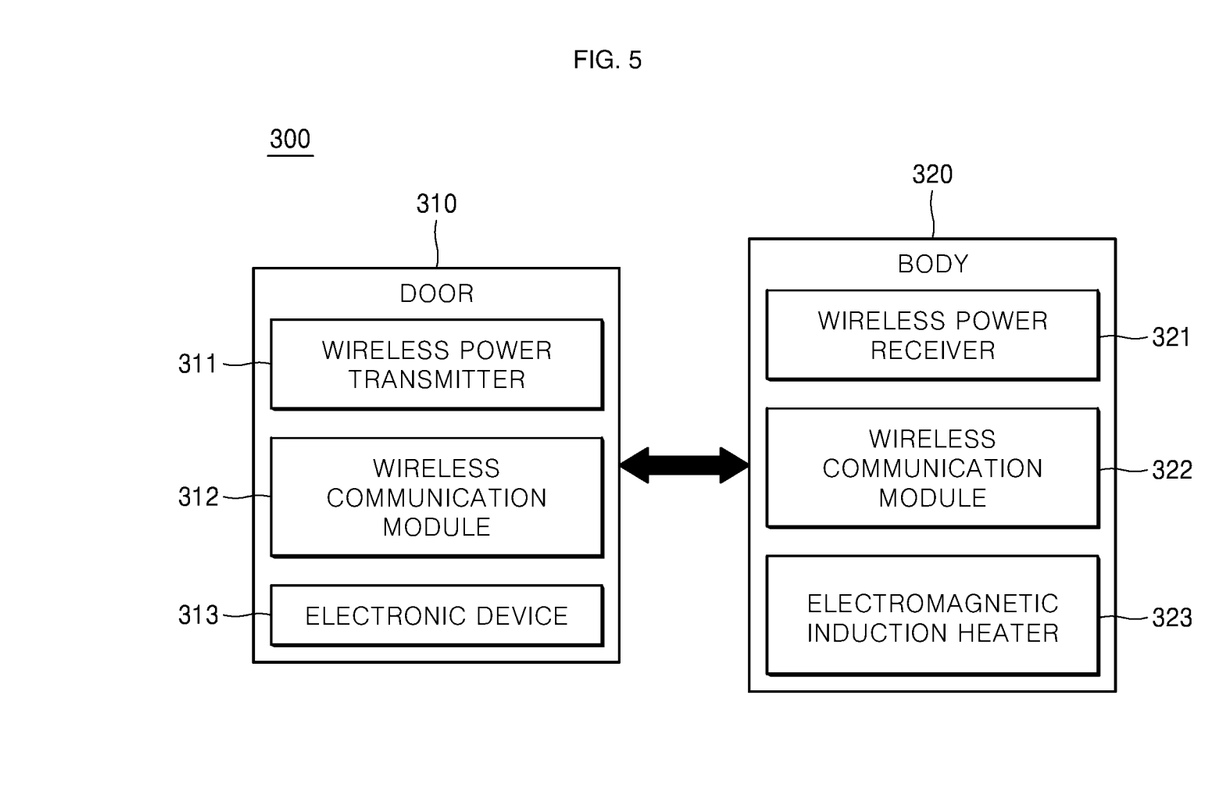
FIG. 5 is a block diagram schematically showing an electromagnetic induction heating cooking appliance according to an embodiment.

FIG. 5 is a block diagram schematically showing an electromagnetic induction heating cooking appliance according to an embodiment. As shown in FIG. 5, electromagnetic induction heating cooking appliance 300 may be identical to the electromagnetic induction heating cooking appliance 100 shown in FIG. 1 except for where a wireless power transmitter and a wireless power receiver are mounted. The electromagnetic induction heating cooking appliance 300 may include a door 310 and a body 320. The body 320 may include a wireless power receiver 321, a wireless communication module 322, and an electromagnetic induction heater 323. The door 310 may include a wireless power transmitter 311, a wireless communication module 312, and electronic device 313. The electronic device 313 may include an input and output display.

Figure 6:
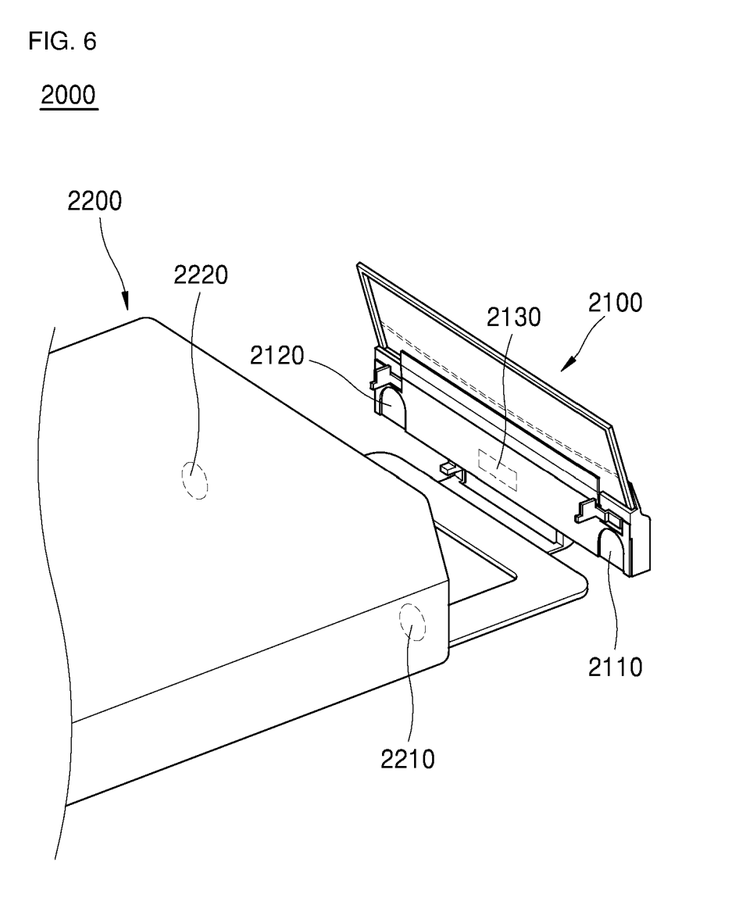
FIG. 6 is a perspective view of an oven toaster as an example of the electromagnetic induction heating cooking appliance shown in FIG. 5 according to an embodiment.

FIG. 6 is a perspective view of an oven toaster as an example of the electromagnetic induction heating cooking appliance shown in FIG. 5 according to an embodiment. As shown in FIG. 6, an oven toaster 2000 may include a door 2100 and a body 2200. The body 2200 may include a wireless power receiver 2210, a wireless communication module 2220, and an electromagnetic induction heater, which may be identical to the electromagnetic induction heater 1230 shown in FIG. 3. The door 2100 may include a wireless power transmitter 2110, a wireless communication module 2120, a display 2130, and an input, which may be identical to the input 1140 shown in FIG. 2.

The wireless power receiver 2210 of the body 2200 may face the wireless power transmitter 2110 of the door 2100. The wireless communication module 2220 of the body 2200 may face the wireless communication module 2120 of the door 2100, and vice versa.

Figure 7:
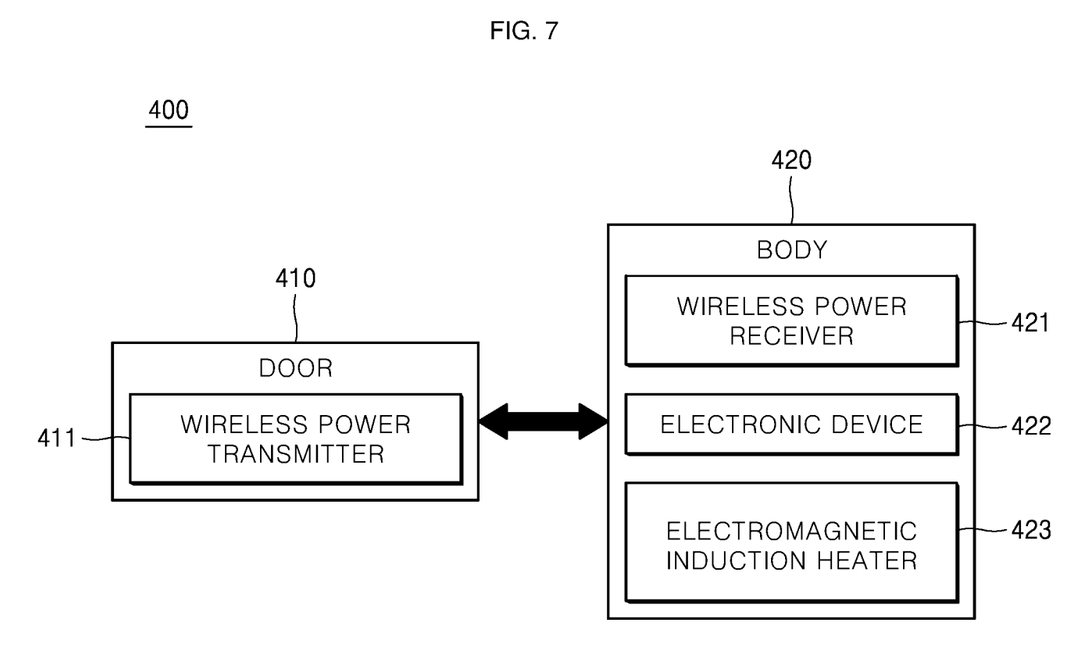
FIG. 7 is a block diagram schematically showing an electromagnetic induction heating cooking appliance according to an embodiment.

FIG. 7 is a block diagram schematically showing an electromagnetic induction heating cooking appliance according to an embodiment. As shown in FIG. 7, electromagnetic induction heating cooking appliance 400 may be identical to the electromagnetic induction heating cooking appliance 300 shown in FIG. 5 except that the former may lack wireless communication modules and may mount the electronic device differently.

The electromagnetic induction heating cooking appliance 400 may include a door 410 and a body 420. The body 420 may include a wireless power receiver 421, an electronic device 422, and an electromagnetic induction heater 423. The door 410 may include a wireless power transmitter 411.

The electronic device 422, including a display and an input, may receive power via the wireless power transmitter 411, and may also receive power from the body 420 via a wired connection.

Embodiments disclosed herein provide an electromagnetic induction heating cooking appliance capable of wirelessly supplying electric power to a door or door part on which an electronic device or electronic devices may be mounted to allow for a simpler structure capable of preventing a safety accident associated with a power supply line. Embodiments disclosed herein further provide an electromagnetic induction heating cooking appliance that may be implemented as an oven toaster, in which a heating plate or a bottom board may be coupled with the door, and may be drawn out of or into the oven toaster as the door moves such that a food container or food may be conveniently placed on the heating plate or the bottom board, and in which power may be wirelessly supplied to the door such that the oven may have a simpler structure and may be used safely.

Embodiments disclosed herein further provide an electromagnetic induction heating cooking appliance in which a door part or door may transmit or receive information to or from a body part or body. Embodiments disclosed herein also provide an electromagnetic induction heating cooking appliance that may be implemented as an oven toaster which may be easily cleaned as the heating plate or the support may be drawn out of or into the oven toaster as the door moves.

In accordance with an embodiment, an electromagnetic induction heating cooking appliance may include a door part or door including a wireless power reception module or wireless power receiver, and a body part or body including a wireless power transmission module or wireless power transmitter. Accordingly, the door part may receive power wirelessly from the body part to operate an electronic device or electronic devices mounted on the door part.

The door may include a heating plate or a bottom board, such that the heating plate or the bottom board may be drawn out of or into the body part as the door moves. Accordingly, a food container, food material, or food may be easily placed on the heating plate or the bottom board, and power may be wirelessly supplied to the door, such that the electromagnetic induction heating cooking appliance may have a simpler structure and operate safely.

The door part and the body part may each include their own wireless communication module. Accordingly, the door part may transmit or receive information to or from the body part.

The heating plate or the bottom board where food, food material, or a food container may be placed may be mounted on the door. Accordingly, the heating plate or the bottom board may be drawn out of or into the body part as the door moves, such that it may be easily cleaned.

According to an embodiment, electronic devices or an electronic device mounted on a door part or door may be operated by receiving power from the body part or body wirelessly, and thus, it is possible to prevent a safety accident associated with a power supply line even if the door is opened and closed repeatedly, and the electromagnetic induction heating cooking appliance may have a simpler structure.

According to an embodiment, as a heating plate or a bottom board is mounted on the door part or door and drawn out of or into the body part or body together with the door part, food, a food container, or food material may be conveniently placed on the heating plate or the bottom board. In addition, as power is wirelessly supplied to the door part, no power supply line may be exposed and no element that takes power supply lines out of or into the body part may exist, such that the electromagnetic induction heating cooking appliance may have a simpler structure and may be used safely.

According to an embodiment, a wireless electromagnetic induction heating cooking appliance may be provided in which a door part or door on which electronic devices or an electronic device are mounted may transmit or receive information to or from a body part or body wirelessly.

According to an embodiment, a heating plate or a bottom board may be drawn into or out of the cooking appliance as the door moves, such that it is easy to clean and it is convenient to use.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electromagnetic induction heating cooking appliance, comprising:
   a body comprising a wireless power transmitter that transmits power wirelessly, a first wireless communication module that transmits and receives signals wirelessly, and an electromagnetic induction heater that heats food accommodated in a space in the body using an induced current; and
   a door comprising a wireless power receiver, a second wireless communication module, and an electronic device connected to and receiving power via the wireless power receiver, wherein:
      the door is coupled with the body such that it opens and closes the space in the body,
      the wireless power transmitter of the body is provided at a front of the body so as to face the wireless power receiver of the door when the door is closed,
      the first wireless communication module is provided at a front of the body so as to face the second wireless communication module when the door is closed,
      the wireless power receiver is provided at a first side of the door, the second wireless communication module is provided at a second side of the door, and
      the electronic device is provided between the wireless power receiver and the second wireless communication module.

2. The cooking appliance of claim 1, wherein the wireless power transmitter comprises a transmitting coil, wherein the wireless power receiver comprises a receiving coil facing the transmitting coil, and wherein the transmitting coil is adjacent to the receiving coil when the door is coupled with the body to cover the space.

3. The cooking appliance of claim 1, wherein the electromagnetic induction heater comprises:
   a working coil that generates an induced current;
   a heating plate that is made of a magnetic material and generates heat with the induced current; and
   a bottom board that supports the heating plate and is provided between the working coil and the heating plate.

4. The cooking appliance of claim 3, wherein the electromagnetic induction heater further comprises:
   a temperature sensor that measures a temperature of the heating plate, wherein an end of the temperature sensor is inserted into a hole formed in the bottom board and is in contact with the heating plate.

5. The cooking appliance of claim 3, wherein a portion of the bottom board is transparent, and wherein the electromagnetic induction heater further comprises a non-contact temperature sensor that measures a temperature of the heating plate without contacting the heating plate.

6. The cooking appliance of claim 3, wherein the electromagnetic induction heater is provided at a lower portion of the body, and wherein the body further comprises an infrared heater and a reflection plate that reflects radiant heat from the heating plate, the infrared heater and the reflection plate being coupled to an upper portion of the body.

7. The cooking appliance of claim 1, wherein the electronic device comprises a display on which an operating state of the cooking appliance and a menu are displayed, and an input that allows the menu to be selected.

8. The cooking appliance of claim 1, wherein the door further comprises a holding wire that supports food, wherein the holding wire is drawn out of the space of the body and drawn into the space to face the electromagnetic induction heater depending on the opening and closing of the door.

9. The cooking appliance of claim 1, wherein the door further comprises a battery that selectively supplies power to the electronic device, and a controller that controls power supplied to the electronic device.

10. An electromagnetic induction heating cooking appliance, comprising:
a body comprising a wireless power transmitter that transmits power wirelessly, a first wireless communication module that transmits and receives signals wirelessly, and an electromagnetic induction heater that heats food accommodated in a space in the body using an induced current; and
a door comprising a wireless power receiver, a second wireless communication module, an electronic device that is connected to and receives power via the wireless power receiver, a battery that selectively supplies power to the electronic device, and a controller that controls power supplied to the electronic device, wherein:
the wireless power transmitter is provided at a front of the body so as to face the wireless power receiver of the door when the door is closed,
the first wireless communication module is provided at a front of the body so as to face the second wireless communication module when the door is closed,
the wireless power receiver is provided at a first side of the door, the second wireless communication module is provided at a second side of the door, and
the electronic device is provided between the wireless power receiver and the second wireless communication module.

11. The cooking appliance of claim 10, wherein the controller checks an amount of power supplied to the electronic device via the wireless power receiver and controls the battery so that the wireless power receiver supplies power to the electronic device if the amount of power is small.

12. An electromagnetic induction heating cooking appliance, comprising:
a body comprising a wireless power receiver that receives power wirelessly, a first wireless communication module that wirelessly transmits and receives signals, and an electromagnetic induction heater that heats food accommodated in a space in the body using an induced current;
a door comprising a wireless power transmitter that faces the wireless power receiver and transmits power wirelessly and a second wireless communication module that faces the first wireless communication module, wherein the door is coupled with the body such that the door opens or closes the space in the body; and
at least one door electronic device provided on the door between the wireless power receiver and the second wireless communication module, wherein:
the wireless power receiver of the body is provided at a front of the body so as to face the wireless power transmitter of the door when the door is closed,
the first wireless communication module is provided at a front of the body so as to face the second wireless communication module when the door is closed,
the wireless power receiver is provided at a first side of the door, and the second wireless communication module is provided at a second side of the door opposite to the first side.

13. The cooking appliance of claim 12, wherein the at least one door electronic device comprises a display and an input.

14. The cooking appliance of claim 12, wherein the body further comprises a body electronic device connected to the wireless power receiver that receives power via the wireless power receiver.

15. The cooking appliance of claim 12, wherein the body further comprises a body electronic device that receives power via a power line connected to an external source.

16. The cooking appliance of claim 8, wherein the door includes a support plate provided at a lower end of the door, the support plate being configured to be slideably drawn into the body to close the space or to be slideably drawn out of the body to guide the door and open the space.

17. The cooking appliance of claim 16, wherein the body is formed with a pocket or groove that guides movement of the support plate of the door.

18. The cooking appliance of claim 3, wherein the heating plate is coupled to the door so as to be slideably drawn into or out of the space based on movement of the door such that an item is placed on the heating plate when the heating plate is drawn out of the space, and the item remains on the heating plate when the heating plate is drawn into the space.

* * * * *